(12) United States Patent
Dall'Aglio (10) Patent No.: US 6,487,896 B1
(45) Date of Patent: Dec. 3, 2002

(54) HEAD, SYSTEM AND METHOD FOR THE LINEAR DIMENSION CHECKING OF A MECHANICAL PIECE

(75) Inventor: Carlo Dall'Aglio, Castello d'Argile (IT)

(73) Assignee: Marposs Societa' Per Azioni, Bentivoglio (IT)

( * ) Notice: Subject to any disclaimer, the term of this patent is extended or adjusted under 35 U.S.C. 154(b) by 0 days.

(21) Appl. No.: 09/601,882

(22) PCT Filed: Feb. 26, 1999

(86) PCT No.: PCT/EP99/01389
§ 371 (c)(1),
(2), (4) Date: Aug. 9, 2000

(87) PCT Pub. No.: WO99/47884
PCT Pub. Date: Sep. 23, 1999

(30) Foreign Application Priority Data

Mar. 13, 1998 (IT) ........................................ BO98A0157
Sep. 8, 1998 (IT) ........................................ BO98A0521

(51) Int. Cl.⁷ ........................ G01B 5/012; G01B 7/012; G01B 13/02
(52) U.S. Cl. ............................ 73/104; 33/503; 33/556; 33/558; 33/561
(58) Field of Search ..................... 73/104, 105; 33/503, 33/556, 558, 559, 561

(56) References Cited

U.S. PATENT DOCUMENTS

| | | | | |
|---|---|---|---|---|
| 4,279,079 A | | 7/1981 | Gamberini et al. ........... 33/783 |
| 4,341,019 A | | 7/1982 | Possati ........................ 73/105 |
| 4,503,616 A | * | 3/1985 | Pullen ........................ 33/558 |
| 5,001,464 A | * | 3/1991 | Tanaka ........................ 33/561 |
| 5,526,576 A | * | 6/1996 | Fuchs et al. .................. 33/503 |
| 5,778,550 A | * | 7/1998 | Carli et al. ................... 33/503 |

FOREIGN PATENT DOCUMENTS

| | | | |
|---|---|---|---|
| DE | 44 12 882 | 10/1995 | ................. 73/105 |
| EP | 0 048 851 | 4/1982 | |
| EP | 0 155 662 | 9/1985 | |
| EP | 0 337 671 | 10/1989 | ................. 33/503 |
| WO | 98/20297 | 5/1998 | ................. 33/645 |

* cited by examiner

Primary Examiner—Daniel S. Larkin
(74) Attorney, Agent, or Firm—Dickstein Shapiro Morin Oshinsky LLP (57) ABSTRACT

A checking head (T) includes a casing (1), an arm (2) with a feeler, movable with respect to the casing, and a sensor, such as an inductive position transducer (5). An electronic identifier (27) is fixed to a frame coupled to the head (T), for storing identifying data relevant to the head, information relating e.g. to the configuration and calibration features of the head, and/or compensation values obtained in the course of the calibration phase carried out on a suitable testing equipment.

13 Claims, 4 Drawing Sheets

HEAD, SYSTEM AND METHOD FOR THE LINEAR DIMENSION CHECKING OF A MECHANICAL PIECE

TECHNICAL FIELD

The present invention relates to a head for the linear dimension checking of a mechanical piece, including a support structure, an arm-set, movable with respect to the support structure, with an arm and a feeler, coupled to the arm, for touching a surface of the mechanical piece to be checked, and a sensor, coupled to the arm and the support structure, for generating signals depending on the position of said arm with respect to said support structure. The invention also relates to a system for the linear dimension checking of a mechanical piece, including a head as the one formerly mentioned and a processing unit. Furthermore, the invention relates to a method for the linear dimension checking of a mechanical piece, by means of a checking system including said head and a processing unit.

BACKGROUND ART

Gauging or measuring heads of the known type are described, for example, in International patent application WO-A-98/20297.

In the known heads, the serial number that identifies each head is generally indicated on the casing of the head or on a plate fixed to the casing.

Other information, relating to the specific features of the individual head, is fundamental for determining the type of application that the head is intended for. In the case of heads as those described in the previously referred to International patent application, it is necessary to know, for example, among other things, values relating to the arm-ratio (in other terms the relationship existing between the entity of the feeler displacement and the entity of the consequent displacement of movable elements of the sensor), the force of the thrust spring, the pre-stroke and the retraction. Some of these values may have been set during calibration.

The information relating to these and other values is generally reported on a technical sheet that accompanies the head. Furthermore, this information may also be coded in an alfanumeric sequence and indicated on the plate together with the serial number, for the purpose of matching in an indissoluble and unequivocal way all the information that belongs to the individual head, and for enabling anyone who is involved with the specific application of the head, or has to carry out operations for the technical assistance on the head, to identify in a rapid and safe manner the characteristics of the head. The provision of the alfanumeric sequence (or "code") and the matching of the code to the serial number of the individual head, if, on the one hand, simplifies some handling aspects, by overcoming problems that the possible loss of the technical sheet or the mismatch of technical sheets among different heads may cause, on the other hand does not allow to modify—in the course of the lifetime of the head—the characteristics identified by the coded values, unless giving up the possibility of having the correct information recorded on the head, or undertaking particular and complex procedures for modifying the code. With regard to performance, the heads as those described in patent application WO-A-98/20297 guarantee a high standard of measurement repeatability for relatively broad measuring ranges (and that obviously depend on the dimensions and on the structure of the head and on the type of sensor or transducer utilized). Some factors that do not enable to obtain extremely high standards of performance—at times requested in particular applications—regard the errors and the limits in the linearity of the transducer output signal, and entity variations, however small they may be, of said signal as a consequence of temperature variations.

DISCLOSURE OF INVENTION

An object of the present invention is to provide a gauging head that overcomes the disadvantages of the known heads, in particular insofar as the handling of the information relating to the identification and the usage specifications of the head are concerned.

A head according to the invention achieves this object and provides other advantages. One of these advantages consists in the possibility of retaining and handling in a simple, rapid and safe manner a great amount of information relating to the head, in addition to that regarding the formerly mentioned usage specifications, as, for example, information relating to the technical assistance and/or the repair that the head undergoes in the course of its lifetime. In this way there is no need to manage separate documents, generally in the paper form, that, in the case of the known heads are added to the documents that identify and certify special characteristics of each individual head.

It is another object of the invention to provide a system and a checking method with at least a head that overcome the drawbacks caused by variations in the output signal of the sensor due to linearity errors and/or thermal variation.

These and other objects and advantages are achieved by a system and a checking method according to the invention.

BRIEF DESCRIPTION OF THE DRAWINGS

The invention is now described in more detail with reference to the enclosed sheets of drawings, given by way of non-limiting example, wherein.

BEST MODE FOR CARRYING OUT THE INVENTION

Figure 1:
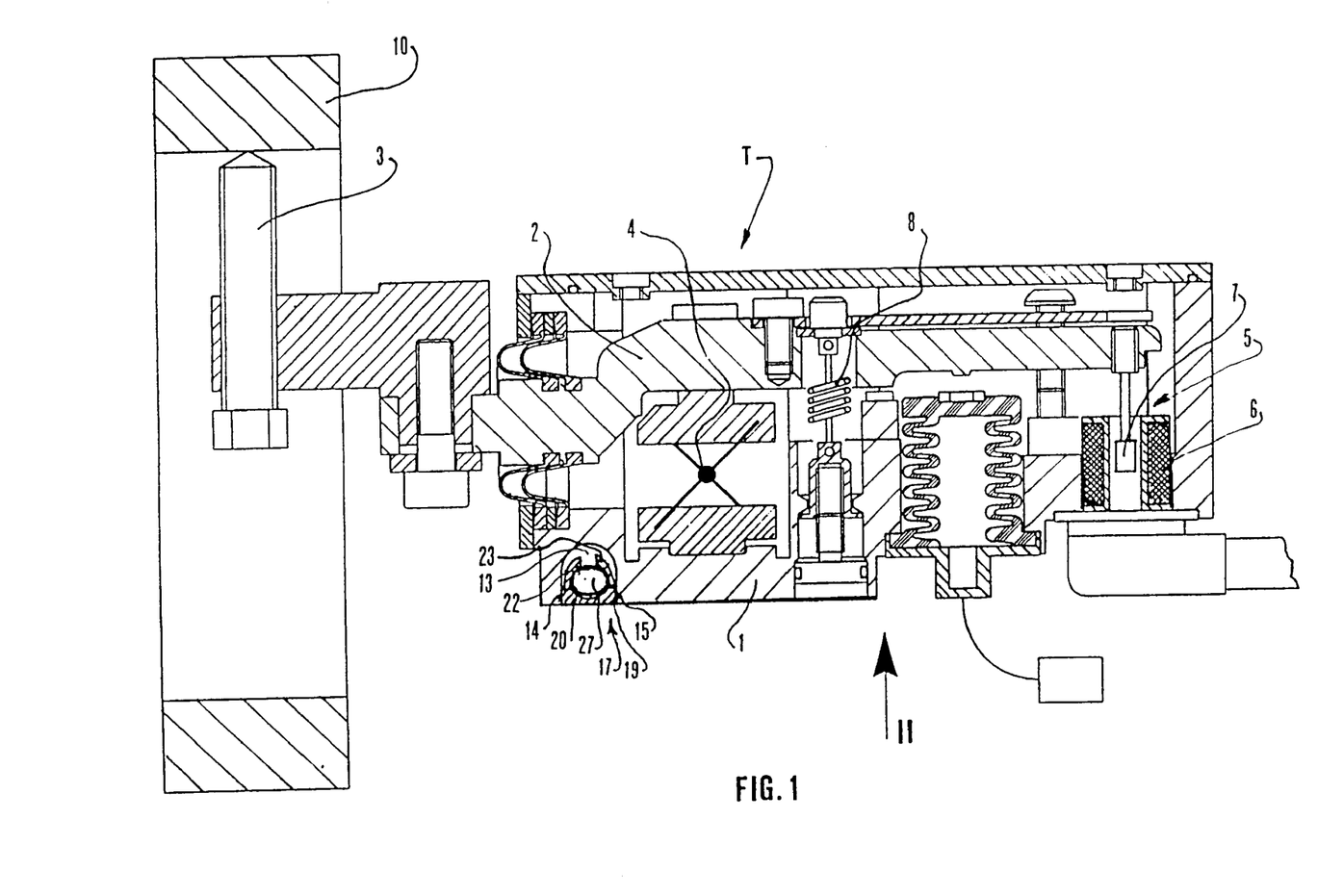
FIG. 1 is a longitudinal cross-sectional view of a gauging head according to the invention.
Figure 2:
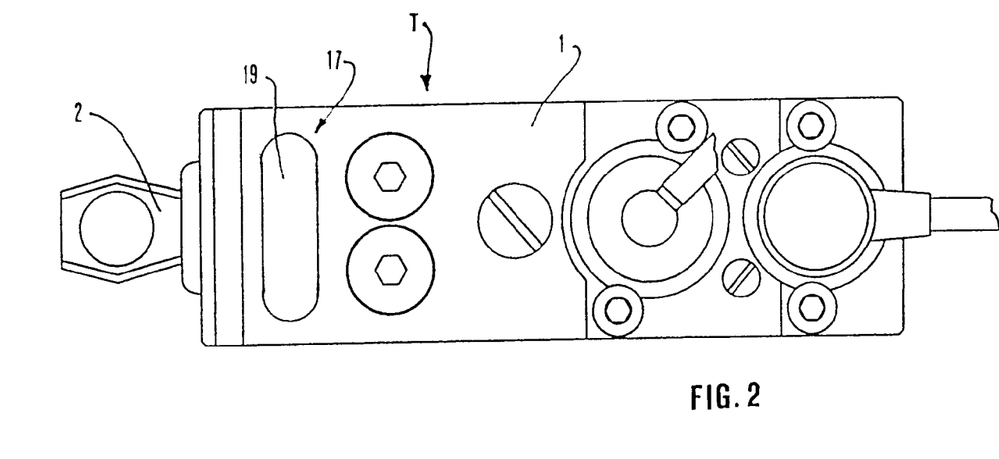
FIG. 2 is a partial view of the head shown in FIG. 1, when viewed from the bottom and in the direction indicated by arrow II.
Figure 3:
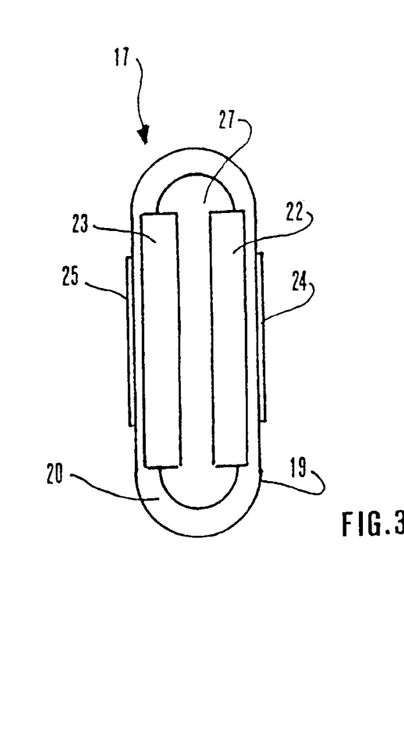
FIG. 3 is an enlarged scale view of a component of the head of FIG. 1.

The head T shown in FIGS. 1 and 2 has a support structure with a casing 1, substantially of a parallelepipedon-shape, and a movable arm-set with an arm 2, substantially arranged along a longitudinal direction, and a feeler 3 coupled to an end of the arm. A fulcrum 4 is coupled to casing 1 and to arm 2 for enabling the latter to accomplish limited rotational displacements about a transversal axis, while a sensor, in particular a position transducer 5, detects the displacements of arm 2 and generates electric signals indicative of these displacements. The transducer 5 is of the inductive type (LVDT or half-bridge type) and includes windings 6 coupled to casing 1 and a magnetic core 7 coupled to arm 2 and movable within the windings 6. A thrust spring 8 is coupled between casing 1 and arm 2 for urging the feeler 3 to contact the surface of a mechanical piece 10 to be checked. For a more detailed description of a gauging head of this type, particularly suitable for the checking of mechanical pieces in the course of the machining in machine tools, like grinding machines, reference is made to International patent application An electronic identification and storage unit 17, also shown in FIG. 3, is housed in the seat 13 and includes a reference and protection frame 19 and an electronic identifier 27 coupled to the frame. The frame 19 is made from plastic material and has an integral structure with a base portion 20 from which two elastic locking portions 22 and 23 and two reference overhangs 24 and 25 protrude. The overhangs 24 and 25 are pressure-inserted in the slots 14 and 15 and they locate and lock the electronic unit 17 in the seat 13.

Figure 5:
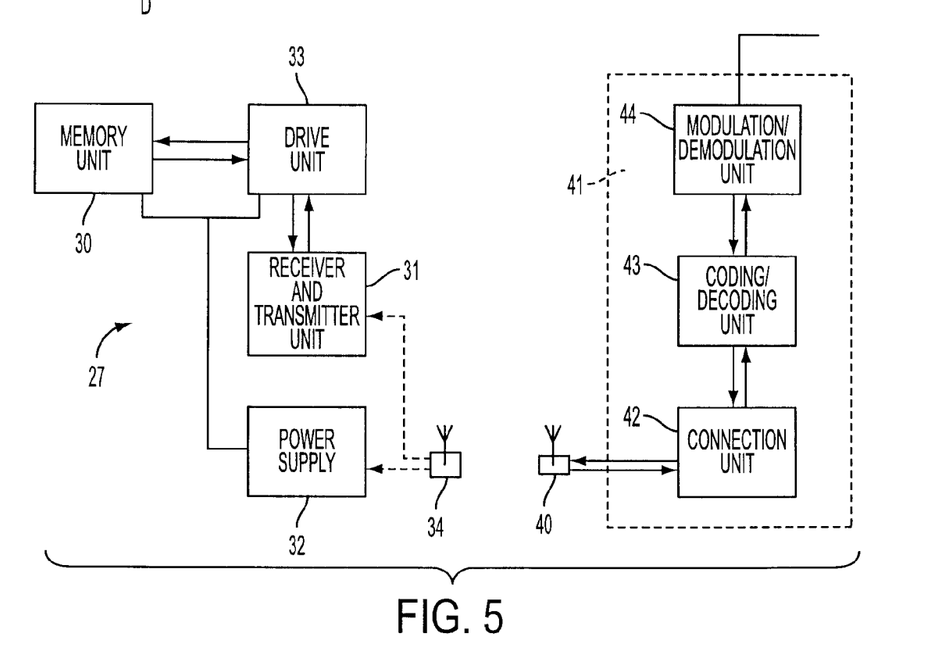
FIG. 5 is a circuit block diagram of two components of the system of FIG. 4.

The electronic identifier 27, of the so-called "transponder" type, is located and coupled between the elastic locking portions 22, 23 and the base 20 of the frame 19, and includes, in substance, as schematically shown in FIG. 5, integrated circuits with a memory unit 30, a receiver and transmitter unit 31, a power supply unit 32, a drive unit 33, and an antenna 34.

The illustrated transponder 27 has a substantially cigar shape and is 15 mm. long. However, the transponder 27 and the associated frame 19 can have other shapes and dimensions.

The antenna 34 is, in general, made of a ferrite core that supports a winding and communicates with the receiver unit 31 and the power supply unit 32 by means of an inductive coupling.

The unit 30 includes, for example, an EEPROM type memory with approximately 1 Kbit read and write memory capacity, and is connected in a bidirectional way, by means of the drive unit 33, to the receiver and transmitter unit 31. The drive unit 33 and the memory unit 30 are fed by unit 32 that comprises only passive circuits activated by the field of the radio frequency signal received through antenna 34.

Figure 4:
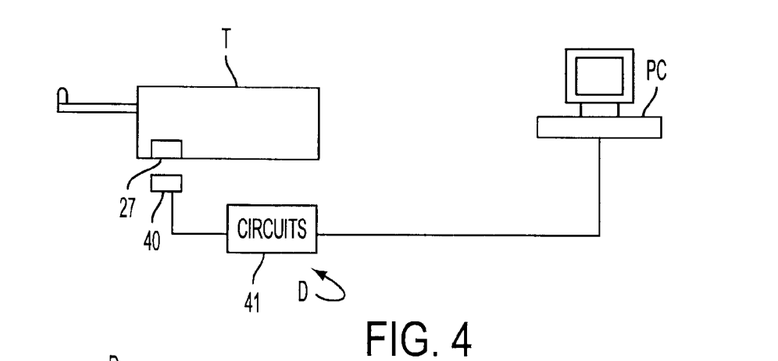
FIG. 4 is a diagram showing a checking system according to the invention.

FIG. 4 shows a control system including, besides the head T illustrated in FIG. 1, a read/write device D and a processor, in general a "personal computer," PC connected to device D.

The device D includes an antenna 40 and circuits 41 with a connection unit 42, a coding/decoding unit 43 and a modulation/demodulation unit 44, as schematically illustrated in FIG. 5.

When the operations required for the calibration and the definition of the specific application characteristics of an individual head, or, more broadly, a "family" of heads have been carried out, the values relating to the specific configuration of that head are collected (or, by statistical processings of the values collected for a certain number of heads, the mean values applicable to that "family" are determined). In the case of the heads T of FIGS. 1 and 2 these values can represent, for example, the arm-ratio, the measuring direction, the settings and the tolerance with respect to the prestroke and the measuring force, etc.

The collected values (or those statistically determined) are stored in unit 30 of transponder 27 together with the data for identifying each individual head T (serial number) by carrying out a simple operation (FIG. 4) that involves the entering of the data in the processor PC and the sending of the data to the transponder 27, by means of a suitable software and the read/write device D. More specifically, the data are coded, modulated and transmitted by radio frequency through the antenna 40. The signal received by transponder 27 through the antenna 34 is utilized on the one hand for generating a power supply voltage in unit 32, and on the other hand for memorizing the data in a suitable area of the memory unit 30. A typical value of the frequency utilized for the transmission is 125 KHz.

The stored data are read when there is the need to know them (for example, by the operator dealing with the specific application of the head T, or by personnel carrying out technical assistance and/or repair) by utilizing a similar read/write device D connected to a similar processor PC. In this case, the processor PC sends an information request signal—through the device D—to the transponder 27, and the data stored in unit 30 are transmitted through the antenna 34 to the antenna 40, read by means of device D and displayed in the processor PC. During the phases for the bidirectional transmission of data and requests, the antennas 34 and 40 reciprocally face each other at a distance of a few millimeters. To this purpose there can be foreseen mechanic reference abutments (not shown in the figures) for more rapidly defining the correct position of the antenna 40 with respect to the casing 1 of the head T.

The transmission occurs through the base portion 20, at a side of the casing 1 of the head T, of the plastic frame 19 that supports the transponder 27, and is unaffected by debris or other foreign matter potentially present on the external surface of the base 20. The frame 19, besides enabling the coupling—in a simple and rapid way—of the transponder 27 to the casing 1, also guarantees appropriate protection of the components of the transponder 27, in particular in especially harsh environmental conditions, as those existing in the workshops where the heads T of FIGS. 1 and 2 are utilized.

Therefore, the presence of the transponder 27, requiring a very limited space, enables one to store identifying and characterizing data in the head T itself, and to extract these data in a very simple and rapid manner when necessary. It is obvious that the handling of these data is facilitated and so is the possibility of having access to these data for modifying them (for example, when the characteristics of the head T change) and always maintaining correct and updated information. Furthermore, the possibility of preventing the reading and/or the writing of some or all the data stored in transponder 27 (by activating suitable access keys) safeguards against undue acquisitions or alterings of data by anyone who is not qualified to do so.

Besides the data already briefly mentioned, in transponder 27 it is possible to store information relating to modifications and operations that the head T undergoes in the course of its lifetime, in order to have an ever-immediate possibility of access to the complete history of the head T. Information of this type may include, for example, data regarding the maintenance or the repair (date, type of repair and time taken), shipping dates, and other.

The operations for the storing and the subsequent reading are similar to those previously described.

Additional information that can be stored in transponder 27 regards the compensation values detected in the course of the calibration carried out on a testing equipment and intended for being utilized in the course of the operation of the head T for improving its performance. More specifically, these values can be utilized for correcting linearity errors of the output signal of transducer 5 and/or alterations of the latter as a consequence of thermal variations.

As far as the linearity errors are concerned, a sequence of operative positions of core 7 within the windings 6 and of corresponding compensation values of the signal output by transducer 5 are obtained in the course of the head T calibration carried out on specific testing equipment. The sequences are stored, for example in a tabular form, in a suitable area of the memory unit 30 of the transponder 27, by means of the processor PC and the read/write device D, by carrying out operations similar to those previously described with reference to FIG. 4.

Figure 6:
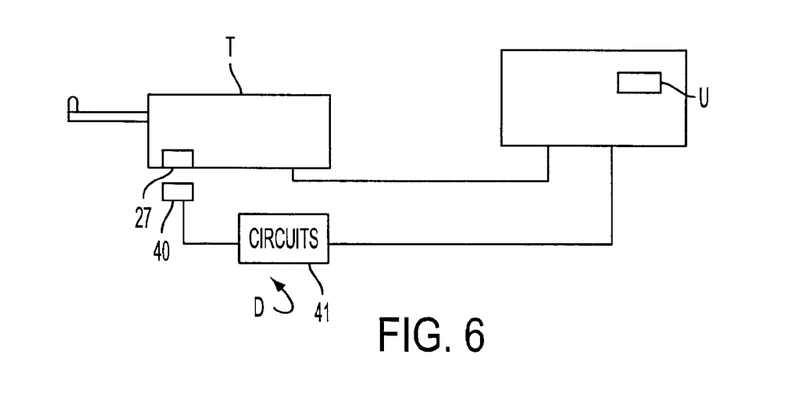
FIG. 6 is a diagram showing another checking system according to the invention.

FIG. 6 shows a checking system similar to the one of FIG. 4 including a processing, display and control unit U connected, by means of electric cables, to both the head T and the device D.

When the head T is used, for example, for checking a mechanical piece and before the actual checking operations start, the compensation values are read from transponder 27 by means of a read/write device D and sent directly to the processing, display, and control unit U that also receives the output signals of the transducer 5 of the head T. In the course of the checking operations, the transducer 5 signal is corrected in unit U on the basis of the read compensation values. As these values are indicative of the linearity errors at a discrete, although possibly high, number of reciprocal positions between the core 7 and the windings 6 of the transducer 5, it is furthermore possible to process the values, in a known way, by interpolation, for compensating the output signal of the transducer 5 in a substantially continuous way within the entire operation range of the head T.

As an alternative to the defining and the storing of the compensation values in a tabular form, the error values detected during the calibration phase can be processed for obtaining a compensation curve, and the coefficients of its polynomial (typically of the 3rd degree) can be stored in transponder 27.

The above described procedure enables one to achieve particularly high standards of performance of the head T insofar as accuracy is concerned, in particular near ends of the measuring range of transducer 5. Moreover, this procedure enables one to achieve, without modifying the mechanical characteristics of the transducer, a broader measuring range while accuracy remains substantially unaltered.

The compensation values stored in the transponder 27 and utilized by the head T during operation can be directly read in the course of the operations for the calibration of the head T, as previously described, or can be obtained by statistical processings of data detected during the testing of a certain number of heads that belong to a same "family", in other terms that have common characteristics. By utilizing the compensation values thus achieved for all the heads belonging to a same "family", it is possible to considerably improve accuracy, even in those cases in which there is not required an extremely high level of performance, as that which would be achieved by the individual detecting of the linearity errors to be compensated.

As an alternative to the direct connecting of the read/write device D to the processing, display and control unit U shown in FIG. 6, it is also possible to read the compensation values stored in the transponder 27 of the head T by means of the processor PC shown in FIG. 4, and enter these values in another known way in the processing unit U.

Figure 7:
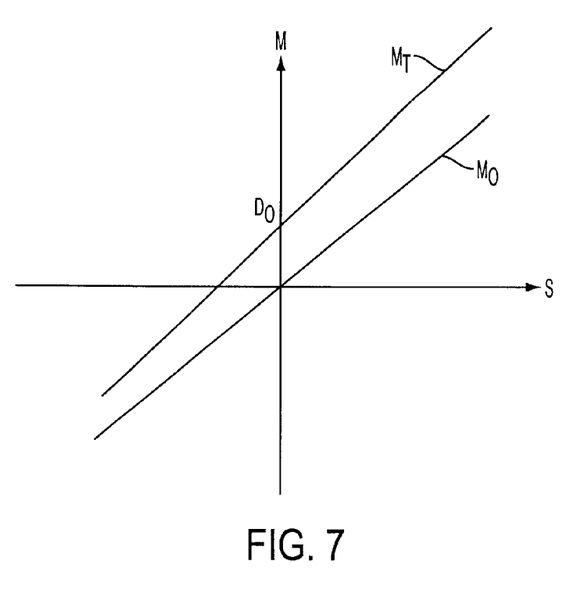
FIG. 7 is a graph showing the variations in the output signal of a head according to the invention caused by thermal variations.

Another possible compensation regards the repeatability errors of the head T generated by temperature variations that cause alterations of the characteristics of the transducer 5. More specifically, as schematically shown in FIG. 7, where the s axis stands for the displacement of the feeler 3 and the M axis indicates the measurement detected on the basis of the output signal of transducer 5, the straight line $M_0$ represents the measurement detected as the displacement s varies at a reference temperature $t_0$, and the straight line $M_T$ indicates the same measurement at a reference temperature $t_T$ other than $t_0$. The straight lines are bound by the following equation:

$$M_T = M_0 + [k_1 (t_T - t_0)] + [M_0 k_2 (t_T - t_0)]$$

that does not consider terms of a higher order, that are generally negligible.

The term $[k_1 (t_T - t_0)]$, or "zero drift", indicates the measurement variation, as the temperature varies, at the zero position of transducer 5 (s=0) and is indicated by reference $D_0$ in FIG. 7.

The term $[k_2 (t_T - t_0)]$, or "sensitivity drift", indicates the measurement variation caused by variations in the transducer sensitivity as the temperature varies.

With reference to FIG. 7, it can be stated that the term $[k_1 (t_T - t_0)]$ indicates the distance between the two straight lines $M_T$ and $M_0$ at s=0, while $[k_2 (t_T - t_0)]$ indicates the angle formed by the two straight lines.

The values of the coefficients $k_1$ and $k_2$, that enable to find the trend of the measurement $M_T$ when the reference straight line $M_0$ and the temperature difference $(t_T - t_0)$ are known, are detected in an experimental way during the calibration of the head T. As already described with regard to the compensation of the linearity errors of the transducer 5, in this case too the values of the coefficients $k_1$ and $k_2$ can be detected and individually utilized for each single head T, or be defined in the design phase, or detected on the basis of a statistical processing, in particular as mean values of the data relating to a certain number of heads that have common characteristics and utilized for compensating any head that has these characteristics. Both the methods provide worthy improvements in the repeatability of the heads, even though, obviously, the improvements provided in the first case are more evident.

As far as the operations required for the storing of the value of the coefficients in the transponder 27 and their transfer to the processing, display and control unit U are concerned, they are identical to those previously described with reference to the other information stored in, and transferred to, the transponder 27.

In order to compensate, in processing unit U, the errors due to the thermal variations, it is mandatory, as already mentioned, to detect the temperature variation $(t_T - t_0)$ with respect to a reference temperature. For this purpose there can be utilized a temperature sensor of a known type (for example, a "thermistor") inserted in the head T. As an alternative, and according to a characteristic of the formerly described head T, indications relating to the temperature variation can be obtained by employing the components of the position transducer 5 for detecting variations in the electric resistance of the windings 6 and by processing these variations with data that identify the characteristics of the material from which the windings are made. More particularly, the temperature variation can be calculated in the following way $$(t_T - t_0) = (R_T - R_0)/\alpha$$

where $(R_T - R_0)$ is the resistance difference of the windings 6 of the transducer 5 at temperature t, with respect to a reference temperature, and $\alpha$ is a constant that depends on the type of material.

Figure 8:
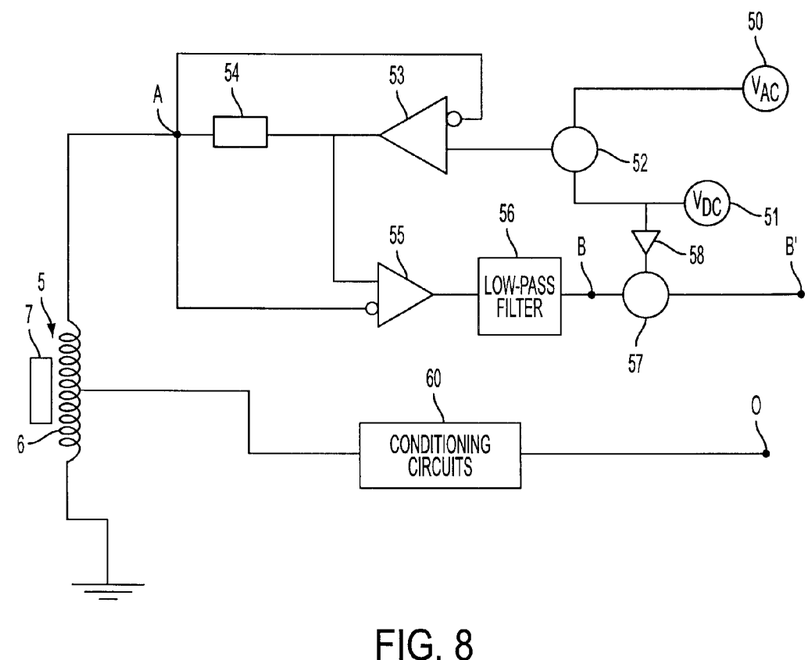
FIG. 8 is a circuit diagram showing some components of a checking system according to the invention.

FIG. 8 shows the power supply and processing circuits that can be utilized with transducer 5, the latter being of the so-called "half bridge" type. FIG. 8 shows a source of alternating voltage 50 and a source of direct voltage 51, an adder 52, a drive circuit 53 with a shunt resistance 54, an amplifier 55, a low pass filter 56, a second adder 57, an attenuation circuit 58 and circuits 60 for conditioning the output signal of transducer 5.

An alternating voltage $V_{AC}$ for the power supply of the transducer and a direct voltage $V_{DC}$ are provided by the sources 50 and 51, respectively, and added in the adder 52. At point A the voltage is kept substantially constant by the drive circuit 53 and the voltage drop at the ends of the shunt resistance 54 is amplified (55) and filtered (56) to eliminate the alternating component (point B). An off-set voltage $V_{OS}$, obtained, through the attenuation circuit 58, from the direct voltage generated by source 51, is subtracted (57) from the voltage $V_B$ so obtained, to get a voltage $V_{B'}$ at point B' that is provided to external processing means to detect and calculate the temperature variation. The attenuation circuit 58 is properly set, in a known way, so that the voltage $V_{OS}$ is substantially the value that $V_B$ assumes in correspondence of a reference temperature to. As a consequence, $V_{B'}=0$ when $t=t_0$. The variations of the resistance R of the windings 6 as the temperature changes cause current variations and consequent changes in the voltage drop at the ends of the shunt resistance 54, and in voltages $V_B$ and $V_{B'}$: by periodically detecting the latter voltage $V_{B'}$ it is therefore possible to calculate the resistance variation $(R_T-R_0)$ with respect to a reference value $R_0$ corresponding to temperature $t_0$, and to get the temperature change that is the cause of such resistance variation.

The calculation $(R_T-R_0)$ made on the basis of the voltage difference detected at point B' involves known quantities like the value of the off-set voltage $V_{OS}$, the gain of the circuits 53 and 55 and the value of resistance 54, according to equations that are not provided for the sake of simplicity.

The conditioning circuits 60 provide the output signal of the transducer 5 at point 0 and are of a known type herein not described in detail.

According to the above description, the use of the transponder 27 housed in the casing 1 of the head T provides the possibility of storing different types of information (identification, characteristics, calibration, compensation, . . . ) that are bound to the head T in an indissolubile way and can be read in a simple, rapid, and orderly way by inexpensive and common means, like the read/write devices D.

Different embodiments of the invention are possible, e.g. as regards the structure of the head (shape and arrangement of movable arm, feeler and fulcrum, kind of sensor that may include a switch, etc.) and of the reference and protection frame. Moreover, the transponder 27 can be differently arranged, for example it can be coupled, by means of a proper frame, to a portion of the electrical cable of the head (a cable is shown in FIGS. 1 and 2). In this way it is possible to assemble the transponder 27 to a head having a support structure lacking the dedicated seat 13.

What is claimed is:

1. A head for the linear dimension checking of a mechanical piece including:
   a support structure,
   an arm-set, movable with respect to the support structure, with
   an arm, and
   a feeler, coupled to the arm, for touching a surface of the mechanical piece to be checked, and
   a sensor, coupled to said arm and to said support structure, for generating signals depending on the position of said arm with respect to said support structure,
   the head also including an electronic identification unit with an electronic identifier for storing identifying data relevant to the head, and a reference and protection frame for the electronic identifier.

2. A head according to claim 1, wherein the support structure defines a seat, the electronic identification unit being housed in said seat.

3. A head according to claim 1, wherein the electronic identifier includes storage means and transmitter and receiver means for the wireless transmission and the reception of the identifying data relevant to the head.

4. A head according to claim 3, wherein said transmitter and receiver means include an antenna and a radio frequency receiver and transmitter unit.

5. A head according to claim 4, wherein the reference and protection frame includes reference portions for locating and locking the position of the electronic identification unit in the seat, and elastic locking portions for cooperating with the electronic identifier for locking its position on said frame.

6. A head according to claim 5, wherein the reference and protection frame has an integral structure made from plastic material.

7. A system for the linear dimension checking of a mechanical piece with a head according to claim 1, comprising a processing unit, a read/write device connected to the processing unit, and including receiver and transmitter means adapted for transmitting and receiving data to and from said electronic identification unit of the head by means of a wireless communication.

8. A system according to claim 7, wherein said receiver and transmitter means are adapted for receiving and transmitting data by way of a transmission of radio frequency modulated electric signals.

9. A system according to claim 8, wherein said processing unit includes a processing, display, and control unit connected to the head and adapted for receiving said signals of the sensor of the head, the processing, display, and control unit being adapted for receiving, through the read/write device, compensation values stored in the electronic identification unit and processing said compensation values with the signals of the sensor of the head.

10. A method for the linear dimension checking of a mechanical piece by means of a checking system according to claim 7, including the following steps:
   testing and setting up of the head including:
      calibrating the head by utilizing testing equipment,
      detecting, in the course of the calibrations and upon the occurring of specific displacements of the feeler, alterations of the signals of the sensor with respect to a theoretic trend, and
      storing the values indicative of the detected alterations in the electronic identification unit, by means of the read/write device, and
   carrying out, by means of the head, checking operations including:
      transferring values indicative of the detected alterations from the electronic identification unit to the processing unit, by means of the read/write device, sending the signals of the sensor upon the occurring of displacements of the feeler to the processing unit, and processing, in the processing unit, said signals of the sensor and said values indicative of the detected alterations for compensating the trend of the signals of the sensor with the values indicative of the detected alterations.

11. The method according to claim 10, wherein said processing in the processing unit includes operations for the interpolation of said values indicative of the detected alterations for obtaining further values indicative of the alterations of the signal of the sensor with respect to a theoretic trend, upon the occurring of displacements of the feeler that do not correspond to performed detections.

12. The method according to claim 10, wherein the calibrations and the detections are performed on a plurality of heads, and the step of carrying out testing and setting up operations of the head includes a statistical processing of the detections taken on the plurality of heads for obtaining the values indicative of the detected alterations.

13. The method according to claim 11, wherein the calibrations and the detections are performed on a plurality of heads, and the step of carrying out testing and setting up operations of the head includes a statistical processing of the detections taken on the plurality of heads for obtaining the values indicative of the detected alterations.

* * * * *

UNITED STATES PATENT AND TRADEMARK OFFICE
CERTIFICATE OF CORRECTION

PATENT NO.      : 6,487,896 B1
DATED           : December 3, 2002
INVENTOR(S)     : Carlo Dall'Aglio It is certified that error appears in the above-identified patent and that said Letters Patent is hereby corrected as shown below:

<u>Title page,</u>
Item [57], ABSTRACT,
Line 7, the number "41" should be deleted.

<u>Column 3,</u>
Line 12, -- WO-A-98/20297. -- should be added after the word "application".

Signed and Sealed this

Third Day of June, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,487,896 B1
DATED : December 3, 2002
INVENTOR(S) : Carlo Dall'Aglio

It is certified that error appears in the above-identified patent and that said Letters Patent is hereby corrected as shown below:

<u>Column 3,</u>
Between line 12 and line 13, the following paragraph should be added:

-- A seat 13 is located on a side of the casing 1 and two coupling slots 14 and 15 are located on opposite walls of the seat 13, near the above mentioned side of the casing 1. --

Signed and Sealed this

Thirteenth Day of April, 2004

JON W. DUDAS
*Acting Director of the United States Patent and Trademark Office*